Patented Jan. 23, 1940

2,188,102

UNITED STATES PATENT OFFICE 2,188,102

SULPHUR DYESTUFFS

Werner Zerweck, Frankfort-on-the-Main-Fechenheim, and Wilhelm Hechtenberg, Frankfort-on-the-Main, Germany, assignors to General Aniline Works, Inc., New York, N. Y., a corporation of Delaware No Drawing. Application August 30, 1938, Serial No. 227,530. In Germany September 6, 1937

2 Claims. (Cl. 260—133)

Our present invention relates to sulphur dyestuffs more particularly to those obtained by acting with an alkali metal polysulphide on a member of the group consisting of a leucoindophenol of the general formula:

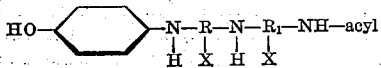

wherein R stands for a member of the group consisting of a radicle of the benzene and naphthalene series, $R_1$ for a member of the group consisting of a radicle of the benzene and polynuclear aromatic series, one X for hydrogen and the other X for a member of the group consisting of hydrogen, COOH and $SO_3H$, and acyl for a member of the group consisting of lower aliphatic acid radicles and benzene-mono-carboxylic acid radicles, and of a corresponding indophenol.

The new dyestuffs are distinguished by mostly bright blue, often greenish blue to green shades of good fastness, particularly to light.

In order to further illustrate our invention the following examples are given, the parts being by weight and all temperatures in degrees centigrade.

Example 1

A mixture of 15 parts of the leucoindophenol from 4-acetylaminodiphenylamine of the formula:

and a polysulphide from 50 parts of crystallized sodium sulphide, 35 parts of sulphur and 20 parts of water is heated for some hours at about 110°. When cool the dyestuff formed is isolated. It is, when dry, a blue powder soluble in concentrated sulphuric acid with a blue color and dyes vegetable fibers from a sodium sulphide bath greenish blue shades of good fastness.

Similar dyestuffs are obtained when starting from leucoindophenols derived from 4-methoxy-acetylamino-diphenylamine, 4-benzoylaminodiphenylamine, 4-benzenesulfaminodiphenylamine or 4-ortho-carboxybenzoylaminodiphenylamine.

Example 2

A mixture of 15 parts of leucoindophenol derived from 4-acetylaminodiphenylamine (as used in Example 1), 20 parts of anhydrous sodium sulphide, 24 parts of sulphur and about 100 parts of alcohol is boiled for some hours in an apparatus provided with a reflux condenser. The alcohol is distilled off in vacuo and the dyestuff is isolated. The dyestuff thus obtained is, when dry, a blue powder soluble in concentrated sulphuric acid with a blue color and dyes the vegetable fibers from a sodium sulphide bath very greenish blue shades of a good fastness.

When starting from leucoindophenols derived from 4-acetylaminodiphenylamines containing in one of the 2.3.2'- or 3'-positions a substituent, such as a methyl or methoxy-group or halogen, similar dyestuffs are obtained.

Example 3

A mixture of 10 parts of the leucoindophenol derived from 4'-acetylaminophenyl-1-naphthylamine of the formula:

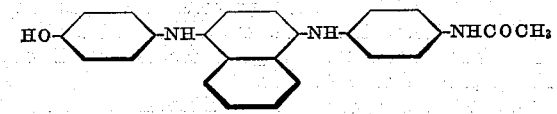

or of the corresponding indophenol, a polysulphide from 17 parts of anhydrous sodium sulphide and 23 parts of sulphur, about 100 parts of butyl alcohol and 6 parts of copper sulphate is heated for some hours in an apparatus provided with a reflux condenser. When the butyl alcohol has been distilled off the dyestuff is isolated. It is, when dry, a dark gray powder soluble in concentrated sulphuric acid with a greenish blue color and dyes the vegetable fibers from a sodium sulphide bath clear green shades of good fastness.

Example 4

A mixture of 25 parts of leucoindophenol (or indophenol) from 4-acetylaminodiphenylamine-2-carboxylic acid of the formula:

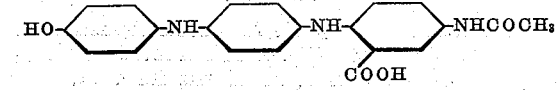

and an aqueous polysulphide solution from 75 parts of crystallized sodium sulphide and 50 parts of sulphur is boiled for some hours under reflux. Then the mass is diluted with about 500 parts of water, 20 parts of crystallized sodium sulphide are added and the dyestuff formed is isolated. It is, when dry, a reddish blue dark powder soluble in concentrated sulphuric acid with a greenish blue color. It dyes vegetable fibers from the sodium sulphide bath bright very greenish blue shades of good fastness to light.

A similar dyestuff is obtained when sulphurizing a leucoindophenol containing chlorine atoms in both ortho positions to the hydroxy group.

Example 5

25 parts of the leucoindophenol (or indophenol) from 4-benzoyl aminodiphenylamine-2-carboxylic acid of the formula:

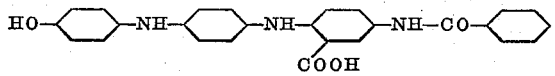

is treated with a polysulphide solution as described in the foregoing example. The dyestuff thus obtained is, when dry, a grayish blue powder soluble in concentrated sulphuric acid with a greenish blue color and dyes the vegetable fibers from the sodium sulphide bath somewhat more greenish blue shades than the dyestuff of the foregoing example.

Example 6

A mixture of the leucoindophenol (or indophenol) from 4-acetylamino-diphenylamine-2-sulphonic acid of the formula:

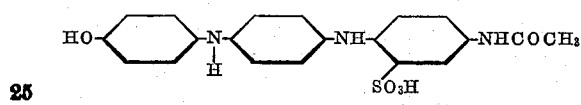

with an aqueous polysulphide solution from 120 parts of crystallized sodium sulphide and 80 parts of sulphur is boiled for a longer time in an apparatus provided with a reflux condenser. After diluting the reaction mass with about 500 parts of water and addition of 30 parts of crystallised sodium sulphide, air is blown in and the dyestuff formed is isolated. It is, when dry, a reddish blue powder soluble in concentrated sulphuric acid with a pure blue color and dyes the vegetable fibers from the sodium sulphide bath greenish blue shades of good fastness to light and a good levelling power.

When starting from the corresponding leucoindophenol derived from 4-benzoylamino-diphenylamine-2-sulphonic acid a similar dyestuff is formed.

Dyestuffs of the same type are obtained when starting from indophenols or leucoindophenols containing a methoxyacetyl radicle or being substituted by alkyl, alkoxy or halogen in one of the 2'- or 3'-positions.

When starting from leucoindophenols derived from 4-benzenesulphoamine-diphenylamine-2-carboxylic or -sulphonic acid, blue dyeing dyestuffs are obtained, when sulfurizing leucoindophenols derived from 5-acetyl- or -benzoylamino-diphenylamine-2-carboxylic acid, the formed dyestuffs dye the vegetable fiber particularly greenish blue shades of good fastness to light.

Example 7

A mixture of 10 parts of leucoindophenol (or indophenol) from N-(4-acetylamino-2-carboxyphenyl)-1-naphthylamine of the formula:

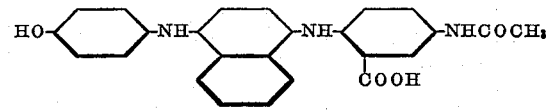

23 parts of anhydrous sodium sulphide, 22 parts of sulphur, about 100 parts of butyl alcohol and 6 parts of copper sulphate is heated for some hours in an apparatus provided with a reflux condenser. The alcohol is distilled off in vacuo and the dyestuff is isolated. It is, when dry, a dark powder, soluble in concentrated sulphuric acid with a greenish blue color, and dyes the vegetable fibers from the sodium sulphide bath bright yellowish green shades of good fastness.

When starting from the leucoindophenol derived from 3-benzoylamino-diphenylamine-2'-carboxylic acid the formed sulphur dyestuff dyes the fiber very greenish blue shades of good fastness to light.

Example 8

15 parts of the leucoindophenol derived from N-(4-acetylaminophenyl)-1-aminonaphthalene-8-sulphonic acid of the formula:

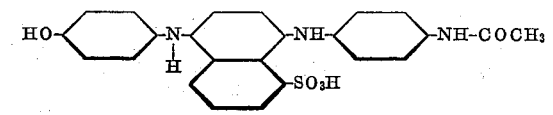

or the corresponding indophenol, are mixed with an aqueous polysulphide solution, prepared from 45 parts of crystallized sodium sulphide and 30 parts of sulphur and the mixture is heated for some hours at about 105° under reflux. When the dyestuff formation is complete, about 300 parts of water and 15 parts of crystallized sodium sulphide and a small quantity of sodium chloride are added and air is blown in. The dyestuff, which is isolated in the usual manner, is, when dry, a dark blue powder, scarcely soluble in concentrated sulphuric acid, with a blue coloration and dyes vegetable fibers from a sodium sulphide bath fast yellowish green shades.

When starting from the leucoindophenol derived from N-(4-acetylaminophenyl)-1-aminonaphthalene-6-sulphonic acid, a dyestuff dyeing more bluish shades of good fastness to light is obtained.

Example 9

20 parts of the indophenol or leucoindophenol of the formula as given in the foregoing example are mixed with an aqueous polysulphide solution for 46 parts of crystallized sodium sulphide and 47 parts of sulphur and 6 parts of copper sulphate and the mixture is boiled for a longer time in an apparatus provided with a reflux condenser. Then about 800 parts of water and 20 parts of crystallized sodium sulphide and a small quantity of sodium chloride are added and air is blown in. The dyestuff thus isolated is, when dry, a black powder, scarcely soluble in concentrated sulphuric acid, with a slightly greenish blue color and dyes the vegetable fibers from a sodium sulphide bath bright yellowish green shades of good fastness.

A more bluish dyestuff of a good fastness to light is obtained when starting from the leucoindophenol derived from N-(4-acetylaminophenyl)-1-aminonaphthalene-6-sulphonic acid.

Example 10

30 parts of the leucoindophenol derived from 4'-acetylaminodiphenyl-1-naphthylamino-8-sulphonic acid of the formula:

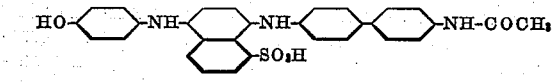

or of the corresponding indophenol are mixed with an aqueous polysulphide solution prepared from 140 parts of crystallized sodium sulphide and 71 parts of sulphur and 9 parts of copper sulphate and the mixture is boiled for some time under reflux. Then the reaction mass is diluted with about 200 parts of water and after addition of about 30 parts of crystallized sodium sulphide the dyestuff formed is blown out with air and isolated in the usual manner. It is, when dry, a greenish black powder soluble in concentrated sulphuric acid with a greenish blue color and dyes vegetable fibers from the sodium sulphide bath bright very yellowish green shades of good fastness properties.

Similar dyestuffs are obtained when starting from indophenols or leucoindophenols, the diphenyl radicle of which is substituted by methyl or methoxy groups, or which contain instead of the diphenyl radicle radicles of the naphthalene, diphenylmethane, diphenylamine, diphenylether, diphenylsulphone, carbazole, diphenyleneoxide and anthracene series. For instance, the sulphur dyestuff derived from the leucoindophenol of the compound of the formula:

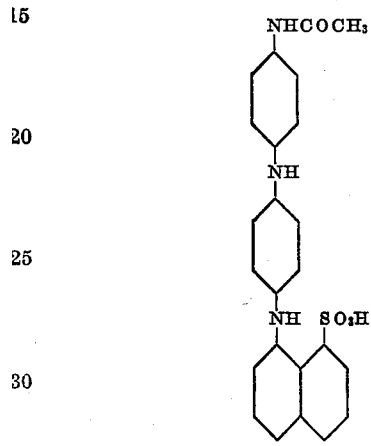

dyes the vegetable fiber greenish blue shades.

We claim:

1. Sulphur dyestuffs obtained by acting with an alkali metal polysulphide on a member of the group consisting of a leucoindophenol of the general formula:

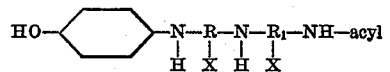

wherein R stands for a member of the group consisting of a radicle of the benzene and naphthalene series, $R_1$ for a member of the group consisting of a radicle of the benzene and polynuclear aromatic series, one X for hydrogen and the other X for a member of the group consisting of hydrogen, COOH and $SO_3H$, and acyl for a member of the group consisting of lower aliphatic acid radicles and benzene-mono-carboxylic acid radicles, and of a corresponding indophenol, which dyestuffs dye the vegetable fibers bright blue to greenish blue to green shades of good fastness, particularly to light.

2. A sulphur dyestuff obtained by acting with an alkali metal polysulphide on the leucoindophenol of the formula:

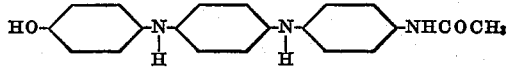

which dyestuff is, when dry, a blue powder soluble in concentrated sulphuric acid with a blue color and dyes vegetable fibers from a sodium sulphide bath greenish blue shades of good fastness.

WERNER ZERWECK.
WILHELM HECHTENBERG.